April 1, 1958     E. J. VAN LIER ET AL     2,828,863
FLUID FILTERS
Filed March 12, 1956
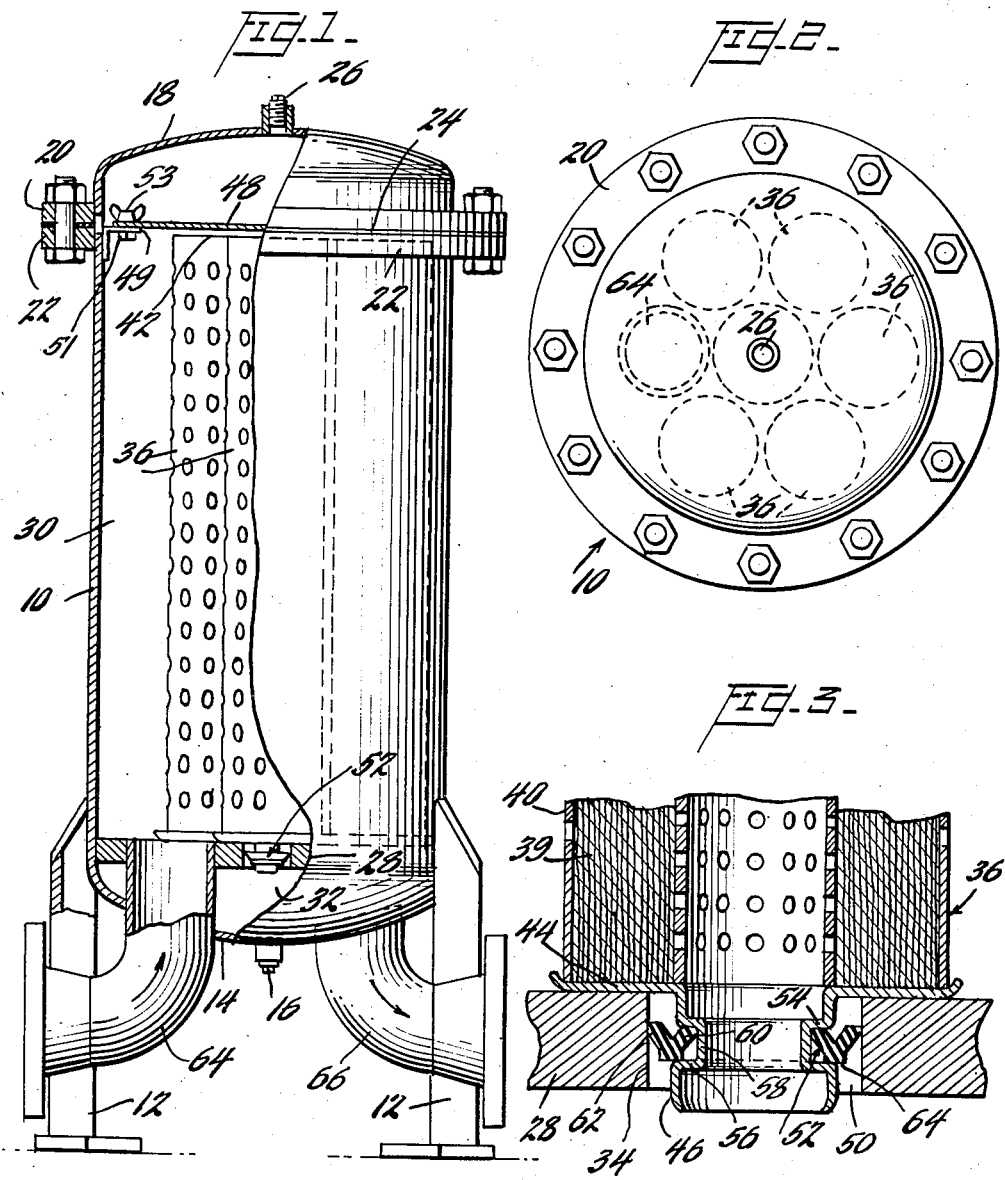
INVENTORS
Emil Johan van Lier
Frank Richard Densiek
BY Watson, Cole, Grindle & Watson
ATTORNEYS

# United States Patent Office 2,828,863
Patented Apr. 1, 1958

2,828,863

FLUID FILTERS

Emil J. van Lier, Martinsville, and Frank R. Gensicke, Roselle, N. J., assignors to Komline-Sanderson Engineering Corporation, Peapack, N. J., a corporation of New Jersey Application March 12, 1956, Serial No. 570,739

13 Claims. (Cl. 210—130)

This invention relates to fluid filters of the type in which the fluid is forced under pressure through one or more filter elements and, more particularly, relates to the provision in such a filter of means for causing any high pressure back surges of the filtered fluid to flow around and by-pass the filter elements.

It has been common practice in fluid filters to place one or more hollow replaceable filter units in a filter chamber adapted to receive fluid under presure. Such filter elements normally are provided with discharge or effluent tubes which project through openings in a division plate or partition to establish communication between the interiors of the several filter elements and an effluent chamber disposed on the opposite side of the partition from the filter chamber. It will be understood that the filtered fluid, after being received in the effluent chamber, is then drawn off through a suitable pipe or conduit.

Under normal operating conditions the fluid pressure in the filter chamber substantially exceeds that in the effluent chamber, thereby causing the fluid to pass through the hollow filters and into the interiors thereof, thence through their respective effluent tubes into the effluent chamber. The filtering elements generally are provided with hollow walls which are filled with filtering paper or other frangible filter material. During the use of such filters the outflow of filtered fluid from the effluent chamber may be quickly cut off at times by the rapid closing of a valve on the outflow side of the effluent chamber, thus resulting in a momentary back surge of pressure which greatly exceeds the pressure within the filter chamber. The resulting backflow of the filtered fluid at high pressure into the filter elements thus frequently ruptures the filter paper or other filtering agent in these elements, rendering them useless for further service and permitting unfiltered fluid to pass through them if they are inadvertently continued in use.

It is primarily to remedy the foregoing defects that the present invention has been conceived.

It is a primary feature, therefore, of the present invention to provide a positive static seal between the effluent tube of each filter element and the opening in the partition through which it passes, such seal being arranged to positively withstand pressure from the filter chamber, but to function as a check valve and permit a backflow of fluid from the effluent chamber into the filter chamber responsive to such back pressure surges.

It is a further object of the invention to provide such a combined seal and valve which may be readily applied to and removed from the filter unit, as an incident to applying or removing the filter element with which it is associated.

Normally, the filter elements will rest on the division plate or partition with their effluent tubes projecting in sealed relation downwardly through the openings in such partition, the lower end of the filter element in such case projecting laterally outwardly beyond the opening and normally resting on the division plate around said opening in such a position as will obstruct the back flow of fluid. It is an important additional feature of the invention to mount each such filtering element, together with its effluent tube and seal, for limited vertical movement in the filter chamber responsive to such back pressure of the fluid, whereby the lower end of the filter element will be moved away from the back flow passage to relieve the obstruction thereof.

By incorporating such back flow or pressure relief function in the seal for the effluent tube of each filter element and thereby permitting the back flowing fluid to escape through an annular path completely surrounding the effluent tube, it has been found that each of the several combined seals and valves, by permitting the back flow of a comparatively large volume of fluid therethrough, will rapidly relieve the pressure resulting from back surges of filtered fluid, thereby preventing the building up of such back pressure to a point where it might damage the filter elements.

Further objects and advantages of the invention will be readily apparent from the following description of the preferred embodiment of the invention in conjunction with the accompanying drawings in which:

Figure 1 represents a side elevation, partly in section, of a complete filtering unit incorporating the improvements constituting the subject matter of the invention;

Figure 2 is a plan view of the filtering unit shown in Figure 1; and

Figure 3 is an enlarged fragmentary section through the lower end of one of the filter elements and its associated portion of the partition.

Referring now in detail to the accompanying drawings:

The reference character 10 generally designates the filter case or vessel which may conveniently be of cylindrical construction and supported in an axially vertical position by the several legs 12. The lower end of this housing 10 is closed by a permanently secured dome-shaped bottom 14 which will preferably be provided with a drain opening normally closed by a threaded plug 16, in accordance with usual practice. The dome-like cover 18 for the upper end of the housing 10 is removable to permit cleaning of the filter chamber and also to permit replacement of the filter elements therein. To this end, the cover 18 is provided with a laterally projecting annular flange 20 which may be bolted to a similar flange 22 secured around the upper end of the housing 10, a gasket 24 preferably being interposed between these flanges to insure a fluid-tight connection. Preferably, the cover 18 will be provided with an air vent which will normally be closed by a threaded plug 26.

Adjacent the bottom of the housing or vessel 10, there is provided a horizontal partition or division plate 28, the outer periphery of which is welded or otherwise secured in fluid-tight relation to the inner face of the housing 10, to thus divide the interior of the housing or vessel 10 into a filter chamber 30 above the partition and an effluent chamber or discharge manifold 32 disposed below the partition 28. Communication between these two chambers may occur as hereinafter described, through one or more circular openings 34 in partition 28. (See Figure 3.)

Disposed in the filter chamber, with their lower ends supported on the partition 28, and their effluent or outflow tubes projecting in sealed relation through the respective openings 34 are one or more hollow filter elements of conventional construction, each designated 36.

By reference to Figure 3, it will be seen that each of such filter elements 36 comprises inner and outer perforated cylindrical walls 38 and 40, respectively, defining an annular space closed at opposite axial ends by the end plates 42 and 44, respectively. Confined in such annular space is the filtering material which will generally consist of multiple thicknesses of filter paper 39. While the upper end of the inner wall or tube 38 is closed by the upper end plate 42, the lower end of this tube communicates with the effluent tube 46 which preferably is formed as an integral part of the lower end plate 44 and which extends in normally sealed relation through one of the openings 34 in partition 28 to establish communication between the effluent chamber 32 and the interior of the filter element. Thus, it will be seen that the pressurized fluid in the filter chamber 30 will pass through the perforated walls 38 and 40 and the intervening filter paper 39 to the interior of the cylindrical wall or tube 38, thence through the tube 46 into the effluent chamber 32.

A hold-down plate 48 fixed at the upper ends of the filter chamber, is positioned to engage the upper ends of the several filter elements 36 to prevent such substantial upward movement of these elements, responsive to back pressures of the filtered fluid, as might retract their effluent tubes 46 with their associated seals from their sealing relation with the respective openings 34. However, hold-down plate 48 will preferably be spaced above the division plate or partition 28 a distance somewhat greater than the lengths of the filter elements 36 to permit a limited amount of upward movement of these elements. Thus the lower ends of the filter elements 36 may be raised clear of the partition 28 responsive to excessive back pressures of the filtered fluid, such as above-mentioned, to permit removal of the said lower ends from obstructing relation relative to the openings 34.

The hold-down plate 48 will preferably be removably supported on angle brackets 49 welded or otherwise secured within the vessel 10. For the purpose of securing the hold-down plate 48 against upward displacement, same is secured in place by means of bolts 51 projecting upwardly through openings in the plate, together with cooperating wing nuts 53, as will be readily apparent from inspection of Figure 1.

Referring again to Figure 3, it will be seen that each of the effluent tubes 46 is of somewhat smaller diameter externally than the opening 34 in which it is received. Thus, its outer wall is radially spaced from the peripheral wall of the opening 34 and cooperates therewith to define an annular back flow passage 50 from the effluent chamber 32 to the filter chamber 30.

An annular flexible seal 52 of the one-way flow type is disposed in this back flow passage 50 to prevent flow therethrough of unfiltered fluid from the filter chamber 30, but to permit a backflow of the filtered fluid whenever the back pressure of fluid in the effluent chamber 32 appreciably exceeds the fluid pressure within the filter chamber. Thus, it will be seen that the seal 52 is operative to relieve excessive pressures occurring within the effluent chamber 32 by permitting the filtered fluid to flow back directly into the filter chamber, bypassing the filter element 36 and thereby avoiding likelihood of damage to such element through rupturing or otherwise damaging the filter paper 39.

Preferably, the seal 52 is carried by the effluent tube 46 of the filtering element and is axially slidably removed and replaced in opening 34 as an incident to removal or replacement of the element 36. For this purpose the effluent tube 46 of each element is formed externally with an annular groove which is defined by upper and lower annular abutments 54 and 56, respectively, and a cylindrical inner wall 58.

The seal 52 which may be formed of synthetic rubber or the like, comprises integrally interconnected and concentrically related flexible sealing flanges 60 and 62 projecting upwardly from a base ring portion 64 at their point of juncture. It will be seen that this base ring 64 is at least partially received in the annular groove in engagement with the lower annular abutment 56, which thus positions the seal 64 against downward displacement by the fluid pressure thereabove. The two flanges 60 and 62 both project upwardly from the base ring 64 toward the filter chamber 30. The inner flange 60 is inclined radially inwardly with its free edge normally in engagement with the cylindrical wall 58 at the bottom of the annular groove in tube 46. It will be seen that the upper wall or abutment 54 of said groove will limit the upward movement of the seal 52 responsive to fluid pressure from therebeneath. The outer flange 62 of the seal is inclined radially outwardly with its free edge normally in sealing engagement with the cylindrical inner wall or periphery of the opening 34.

Since the partition 28 is of substantial thickness, it will be seen that the inner wall of the opening 34 will be of substantial axial extent for proper cooperation with the seal 52 during the limited upward displacement of the element and seal. Due to the inclined upwardly diverging relation of the flanges 60 and 62 and their flexibility, it will be readily apparent that the normally predominant fluid pressure within the filter chamber 30 will urge these flanges 60 and 62 into fluid-tight sealing engagement with their cooperating walls; that is, with the periphery of opening 34 and with the inner wall 58 of the groove, respectively. However, a back pressure in the effluent chamber 32 appreciably in excess of the pressure within the filter chamber, will urge at least one of these flanges, more particularly, the flange 62, away from sealing relation with its cooperating wall surface to permit a back flow of filtered fluid into the filter chamber.

It will thus be readily apparent in the operation of the filter unit in its entirety, that such unit will operate in more or less usual manner under conventional conditions, wherein the pressure within the filter chamber 30 exceeds that within the effluent chamber 32. Normally, fluid will be delivered under pressure through an inflow pipe 64, which extends through both the housing bottom 14 and the partition 28. Such fluid, after being filtered through the walls of the several filter elements 36, will then pass downwardly through the interiors thereof and through the effluent tubes 46 of the respective elements into the effluent chamber 32, from whence it will be drawn away through a discharge pipe 66 shown in Figure 1. However, in the event of a sudden blocking of the flow of the fluid from the effluent chamber as by the sudden closing of a valve, with the resultant build-up of fluid pressure in the effluent chamber in excess of that in the filter chamber, the filtered fluid in the effluent chamber 32 will be caused to flow upwardly through the passages 50 into the filter chamber 30, thus relieving the pressure and avoiding damage to the filter elements 36. Moreover, the increasing pressure will be exerted against the seals 52 and the elements 36 to raise the lower ends of such elements clear of the partition 28 and thereby provide a comparatively unobstructed path for the upwardly flowing fluid as it emerges through the passages 50. Also, such upward movement of the respective filter elements 36 will, to some extent, contribute toward reduction of the pressure within effluent chamber 32.

In this application, we have shown and described only the preferred embodiment of the invention. However, we recognize that the invention may assume other embodiments and that its several details may be modified in various ways, all without departing from our inventive concept. Accordingly, the drawings and description are to be considered as merely illustrative in nature.

Having thus described the invention, what is desired to be secured by Letters Patent is:

1. A fluid filter comprising a fluid-tight vessel, a partition within said vessel dividing same into a filter chamber and an effluent chamber, said partition being formed with a circular opening therethrough, a hollow filter element in said filter chamber including an effluent tube extending through said opening and establishing communication between said effluent chamber and the hollow interior of said filter element, said effluent tube being spaced radially inwardly from the periphery of said opening and therewith defining an annular backflow passage between said chambers, and an annular flexible seal of the one-way flow type disposed in said backflow passage to prevent the flow therethrough of fluid from the filter chamber, and to permit a backflow of fluid from the effluent chamber to the filter chamber when the fluid pressure in the effluent chamber appreciably exceeds that in the filter chamber.

2. A fluid filter comprising a fluid-tight vessel, defining a filter chamber adapted to receive fluid under pressure, and formed with a circular outlet opening, means defining an effluent chamber communicating with said opening, a hollow filter element in said filter chamber including an effluent tube extending through said opening and establishing communication between said effluent chamber and the hollow interior of said filter element, said effluent tube being spaced radially inwardly from the periphery of said opening and therewith defining an annular backflow passage between said chambers, and an annular flexible seal of the one-way flow type disposed in said backflow passage to prevent the flow therethrough of fluid from the filter chamber, and to permit a backflow of fluid from the effluent chamber to the filter chamber when the fluid pressure in the effluent chamber appreciably exceeds that in the filter chamber.

3. The combination of claim 1 wherein said partition extends horizontally, and the lower end of said filter element rests on said partition around said opening, said filter element being free to move upwardly a predetermined extent above said partition, when the fluid pressure in the effluent chamber exceeds that in the filter chamber, thereby reducing the obstructing effect of said lower end on the backflow of fluid from said opening.

4. The combination of claim 3 wherein the seal is carried by the effluent tube for vertical movement therewith.

5. A fluid filter comprising a fluid-tight vessel defining a filter chamber for receiving fluid under pressure, and formed with an outlet opening, a hollow filter element in said chamber having an effluent tube projecting into said opening, said tube being spaced inwardly from the periphery of said opening and therewith defining a backflow passage around the tube, and a flexible seal in said backflow passage preventing the flow of fluid therethrough from the filter chamber but permitting the backflow therethrough toward the filter chamber of fluid at a higher pressure than the fluid in the filter chamber.

6. The combination of claim 5 in which said outlet opening is formed through a generally horizontal portion within the vessel, and said filter element rests on said portion around said opening, said filter element being free to move away from the opening to uncover same responsive to the pressure of said backflowing fluid.

7. The combination of claim 6 wherein the said seal is carried by the effluent tube for movement therewith through the said opening.

8. The combination of claim 7 including means for normally limiting such movement of the filter element to prevent retraction of the seal from said opening.

9. The combination of claim 5 wherein said flexible seal is of annular configuration comprising inner and outer flexible sealing flanges having free marginal edges projecting toward said filter chamber, the inner flange being inclined inwardly toward said effluent tube, and the outer flange being inclined outwardly toward the periphery of said opening, whereby the fluid pressure within said filter chamber will normally urge said flanges into sealing relation with the said tube and the said periphery respectively, but a back pressure in said opening in excess of the pressure within said chamber will urge at least one of said flanges out of its said sealing relation to permit a backflow of fluid into the filter chamber.

10. The combination comprising an enclosed chamber having an opening, a fluid treating element within said chamber having an effluent tube extending into said opening, said tube being spaced inwardly from the periphery of said opening and therewith defining a backflow passage exteriorly of said tube, and a flexible annular seal in said passage preventing the flow of fluid therethrough from the filter chamber, but permitting the flow of fluid from said passage into the chamber through a path which by-passes said fluid treating element.

11. The combination of claim 10 including means carried by said tube for axially positioning the seal thereon, said seal being movable through the opening with said tube.

12. The combination of claim 10 wherein said annular seal includes relatively diverging inwardly and outwardly axially inclined sealing flanges having their free edges projecting toward said chamber, and respectively engaging said tube and the periphery of said opening.

13. In a device of the character described, a plate formed with a circular opening therethrough, a tube extending and movable axially within said opening in concentric radially inwardly spaced relation to the periphery of said opening and with said periphery defining an annular passage, means fixed to the tube outside of said annular passage and movable with the tube to obstruct said passage, and a flexible annular seal carried by and movable axially with the tube in said passage, said seal comprising relatively diverging inwardly and outwardly axially inclined sealing flanges having their free marginal edges projecting in the same axial direction and respectively engaging said tube and said periphery.

References Cited in the file of this patent

UNITED STATES PATENTS

| | | |
|---|---|---|
| 280,212 | Miles | June 26, 1883 |
| 2,507,125 | Townsend | May 9, 1940 |
| 2,575,900 | Vokes | Nov. 20, 1951 |
| 2,576,810 | Ratelband | Nov. 27, 1951 |
| 2,734,636 | Foster | Feb. 14, 1956 |
| 2,743,737 | Textor | May 1, 1956 |

FOREIGN PATENTS

| | | |
|---|---|---|
| 697,816 | Great Britain | Sept. 30, 1953 |